Figure 1:
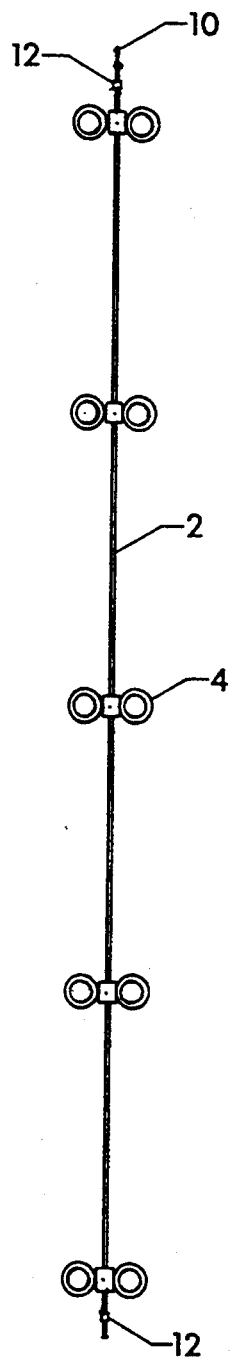

United States Patent [19]

Spence

[11] Patent Number: 5,447,121

[45] Date of Patent: Sep. 5, 1995

[54] ESCORT SAFETY LINE FOR CHILDREN

[76] Inventor: Edwin W. Spence, 6252 S. Humboldt. Pl., Littleton, Colo. 80121

[21] Appl. No.: 992,000

[22] Filed: Dec. 17, 1992

[51] Int. Cl.$^6$ .............................................. A01K 29/00
[52] U.S. Cl. ................................................. 119/770
[58] Field of Search ................... 119/96; 128/864, 876; 273/453

[56] References Cited

U.S. PATENT DOCUMENTS

| | | | |
|---|---|---|---|
| 3,563,208 | 2/1971 | Nero | 119/96 |
| 3,652,087 | 3/1972 | Carmen | 273/453 |
| 4,765,279 | 8/1988 | Klickstein | 119/96 X |

FOREIGN PATENT DOCUMENTS 2066674  7/1981  United Kingdom ................ 273/453

Primary Examiner—Gene Mancene
Assistant Examiner—Thomas Price
Attorney, Agent, or Firm—Edwin W. Spence

[57] ABSTRACT

An improved method providing safety for young children being escorted from one point to another by adults. The method is non-tethering and non-restraining requiring only direction, to instruction-prone children to hold onto a ring. A number of Dual-Rings (4), forming a plurality of two-position entities, are slid onto a flexible, common center supporting line (2), through a hole in the Dual-Rings and held in place by Dowel Pins (8) which pass through the Dual-Rings and line. One Dual-Ring provides two positions and accommodates two children. The Dual-Ring spacing along the longitudinal axis of the center support line is appropriate to allow children to be escorted without companion interference. The individual ring spacing, of a Dual-Ring entity, is minimal, thus allowing the children to walk closely abreast to one another, in two columns, on narrow sidewalks prevalent in school/ preschool residential areas. The Dual-Ring is further embodied with imprinted numbers, letters or symbols adjacent to each ring allowing the adult(s) to foster the learning process of children. By option, an Extension Line (14) of proper length, with a small loop on one end, and a loop with Clip Fastener (10) on the other, permits augmentation of another escort line. The non-rigid, flexible characteristics of the Escort Safety Line permit ease of handling, compactness and lightweight mobility.

5 Claims, 1 Drawing Sheet

ESCORT SAFETY LINE FOR CHILDREN

BACKGROUND—FIELD OF INVENTION

This invention relates to safety for young children and serves as an educational tool for adults to enhance the learning process of children.

BACKGROUND—DESCRIPTION OF PRIOR ART

In the past, and still ongoing, teachers would, on occasion, take their classes of young children outside the boundaries of the school grounds on an excursion or field trip. While the adults are careful to watch the walking children, there still exists a general disorder of movement by erratic walking, bunching and groups separating. Large gaps are particularly noticeable while crossing intersections creating a dangerous situation. This problem has existed for many years. It has been noted, though seldom, that an ordinary rope has been used for the children to hold onto. This proves unsatisfactory because the children let their hands move forward or backward increasing the possibility of tripping with other children. Investigations of the following prior art exhibits irrelevancy: (114-365) Lifesaving Apparatus Handling Equipment; (135-68) Walking Aids; (215-201) Childproof Bottle Closures; (246-690) Supports—Mounted by Hook or Loop.

OBJECTS AND ADVANTAGES

Accordingly, objects and advantages become apparent when the Escort Safety Line is used. Under adult supervision, children are safely escorted from one point to another in an organized formation. With the introduction of letters or numbers on the Dual-Rings, and creative imagination, the adult can stimulate learning situations for the children while away from their usual environment. The Escort Safety Line may be used in the School/Preschool facility or on the grounds.

DRAWING FIGURES

Figure 2:
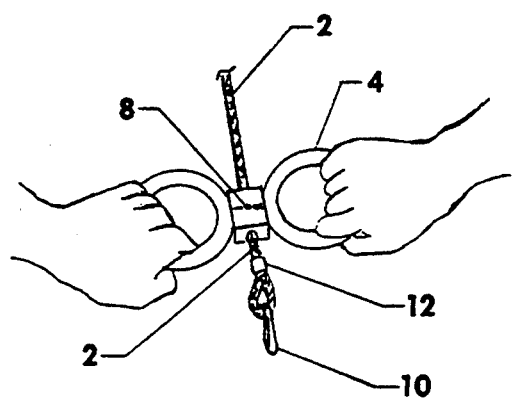
Figure 3:
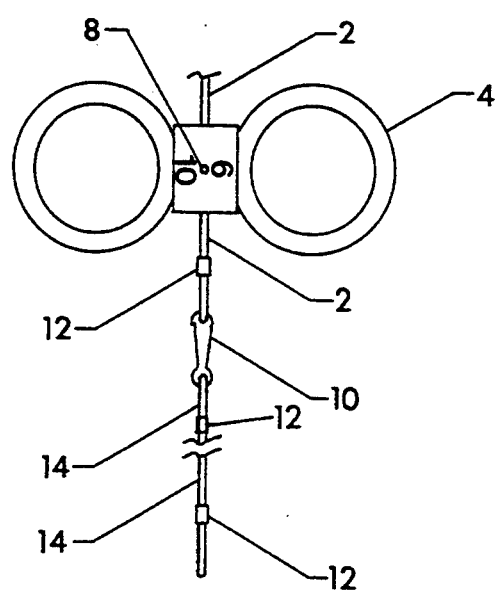

FIG. 1 shows a ten position Escort Safety Line.
FIG. 3 shows a attachment of extension.
FIG. 2 a top view of one Dual-Ring.

REFERENCE NUMERALS IN DRAWINGS

2 Durable line
4 Dual-Ring
14 Extension Line
8 Dowel Pin
10 Fastener
12 Guy Clamp

DESCRIPTION OF INVENTION—FIGS. 1, 2, 3

FIG. 1A is a primary example of the Escort Safety Line. Five non-tethering Dual-rings 4 are attached to a durable line 2 at an appropriate spacing to allow young children to walk comfortably while each child grasps a ring. Attachment of the Dual-ring to the line is accomplished by the use of a Dowel pin 8 as shown in FIG. 2. A dual-ring accomodates two children. On each ring is a letter, number or symbol.

A loop is formed on each end of the Line 2, by use of a Guy Clamp 12. One loop contains a clip Fastener 10 as shown in FIG. 1B. This enables connection to an Extension Line.

While colors of the Dual-rings may vary, Red Yellow and Blue dominate to aid in learning of the primary colors related to Art.

OPERATION OF INVENTION—FIGS. 1, 2, 3

Dual-rings 4 are attached to a Line 2. One ring of the Dual-Ring accomodates one child, and all children are limited to a particular position while being escorted. An organized two-abreast, two-column group results. Each Dual-ring has a letter, number, or symbol on each ring. Learning situations can be created by the adult supervisor whenever and wherever the Escort Safety Line is used.

SUMMARY, RAMIFICATIONS AND SCOPE

While FIG. 1 illustrates an ideal ten-position Escort Safety Line, expansion is made possible by clipping the Fastener 10 of the Extension Line, to the loop of the primary line, permitting attachment of an additional line as shown in FIG. 1B. Conversely, a larger number of Dual-rings may be employed on a given Escort Safety Line for larger groups. A Twenty-Six position (13 Dual-Rings) Escort Safety Line allows use of the complete alphabet with letters imprinted on each ring. Also, the Dual-ring may be a geometrically shaped entity through which the Line passes the material at a proper number of points and fixed in position.

Use of the Escort Safety Line by teachers and other adults satisfies the long need of safety and organization of children. The imagination of the adult can create an array of fun-oriented learning situations. A small, but important, sense of responsibility is bestowed on the child.

I claim:
1. A non-restraining safety line comprising:
   a flexible, center support line, along which are mounted a varying number of dual-rings permitting a voluntary grasping action by instruction-prone children to be excorted by an adult,
   a block portion joining each of said dual rings, and further including a dowel pin extending through said block portion and said support line to releasably mount said dual-rings to said support line.
2. A non-restraining safety line according to claim 1, wherein said dual-rings and said block portion are integrally joined offering a non-tethering grasping of each ring.
3. A non-restraining safety line according to claim 1, wherein each ring of said dual-rings includes indicia adjacently printed for educational fostering of children.
4. A non-restraining safety line according to claim 1, wherein the ends of said center support line have a loop formed on each end, one of which containing a clip fastener.
5. A non-restraining safety line according to claim 4, wherein one of said loops includes an additional support line having a looped end with a clip fastened to said one of said loops.

* * * * *